(12) United States Patent
Inokuchi et al.

(10) Patent No.: US 7,405,541 B2
(45) Date of Patent: Jul. 29, 2008

(54) CONTROL APPARATUS FOR AUTOMOTIVE ALTERNATOR HAVING CAPABILITY OF RELIABLY DETECTING DISCONNECTION BETWEEN ALTERNATOR AND BATTERY

(75) Inventors: Takatoshi Inokuchi, Kariya (JP); Tomomi Tsuzuki, Toyota (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 101 days.

(21) Appl. No.: 11/598,080

(22) Filed: Nov. 13, 2006

(65) Prior Publication Data
US 2007/0114976 A1 May 24, 2007

(30) Foreign Application Priority Data
Nov. 18, 2005 (JP) ............................. 2005-335061

(51) Int. Cl.
*H02J 7/04* (2006.01)
*H02J 7/14* (2006.01)

(52) U.S. Cl. .................................. 322/8; 322/7; 322/37
(58) Field of Classification Search ..................... 322/7, 322/8, 22, 23, 24, 28, 37
See application file for complete search history.

(56) References Cited
U.S. PATENT DOCUMENTS
4,314,193 A * 2/1982 Mortonson .................... 322/28

| | | | | |
|---|---|---|---|---|
| 4,316,134 A * | 2/1982 | Balan et al. | ............ | 322/99 |
| 4,379,990 A * | 4/1983 | Sievers et al. | ............ | 322/99 |
| 4,584,515 A * | 4/1986 | Edwards | ............ | 322/28 |
| 4,985,670 A * | 1/1991 | Kaneyuki et al. | ............ | 322/28 |
| 5,581,172 A * | 12/1996 | Iwatani et al. | ............ | 322/28 |
| 7,009,366 B2 | 3/2006 | Maehara | | |
| 7,235,952 B2 * | 6/2007 | Maehara | ............ | 322/24 |
| 7,235,953 B2 * | 6/2007 | Aoyama | ............ | 322/28 |

FOREIGN PATENT DOCUMENTS

| | | |
|---|---|---|
| JP | A 6-276691 | 9/1994 |
| JP | A 7-015886 | 1/1995 |
| JP | A 2004-248346 | 9/2004 |

* cited by examiner

*Primary Examiner*—Nicholas Ponomarenko
(74) *Attorney, Agent, or Firm*—Oliff & Berridge, PLC

(57) ABSTRACT

According to the present invention, there is provided a control apparatus for an automotive alternator which includes a switch, a target voltage setter, a voltage regulator, and a disconnection detector. The switch is configured to be selectively turned on and off so as to intermittently excite the alternator. The target voltage setter works to set a target voltage. The voltage regulator works to regulate an output voltage of the alternator to the target voltage through controlling on/off operation the switch. The disconnection detector works to detect disconnection between the alternator and an on-board battery to be charged by the alternator. The disconnection detector is configured to detect the disconnection, when the target voltage is changed from a lower value to a higher value, based on a time required for the voltage regulator to bring the output voltage of the alternator from the lower value to the higher value.

18 Claims, 4 Drawing Sheets

CONTROL APPARATUS FOR AUTOMOTIVE ALTERNATOR HAVING CAPABILITY OF RELIABLY DETECTING DISCONNECTION BETWEEN ALTERNATOR AND BATTERY

CROSS-REFERENCE TO RELATED APPLICATION

This application is based on and claims priority from Japanese Patent Application No. 2005-335061, filed on Nov. 18, 2005, the content of which is hereby incorporated by reference into this application.

BACKGROUND OF THE INVENTION

1. Technical Field of the Invention

The present invention relates generally to control apparatuses for automotive alternators and electric power generation systems for vehicles. More particularly, the invention relates to a control apparatus for an automotive alternator which has a capability of reliably detecting disconnection between the alternator and an on-board battery to be charged by the alternator.

The disconnection includes a state where a conducting wire electrically connecting the alternator and the battery is broken and a state where the conducting wire is detached from at least one of terminals of the alternator and the battery. This definition will be applied to all the description in this specification.

2. Description of the Related Art

Japanese Patent First Publication No. H06-276691 discloses a control apparatus for an automotive alternator, which includes a disconnection detector for detecting disconnection between the alternator and an on-board battery to be charged by the alternator.

In this control apparatus, both an output voltage of the alternator and a terminal voltage of the battery are detected. The disconnection between the alternator and the battery is detected based on the characteristic that the output voltage of the alternator is constant regardless of the disconnection whereas the terminal voltage of the battery decreases with occurrence of the disconnection. More specifically, in the control apparatus, the disconnection is detected when the terminal voltage of the battery is lower than a reference voltage.

However, since both the output voltage of the alternator and the terminal voltage of the battery have to be detected, the number of terminals and leads required for the disconnection detection increases. Consequently, the control apparatus and thus the entire electric power generation system become not only complex but also expensive.

U.S. Pat. No. 7,009,366 discloses a voltage regulator for an automotive alternator, which includes a disconnection detecting circuit for detecting disconnection between the alternator and an on-board battery to be charged by the alternator.

In this voltage regulator, only an output voltage of the alternator is detected. The disconnection between the alternator and the battery is detected based on the characteristic that upon being energized, the output voltage of the alternator with the disconnection is higher than that without the disconnection. More specifically, in the voltage regulator, the disconnection is detected when a voltage difference exceeds a predetermined threshold; the voltage difference is the difference between the output voltage of the alternator detected when a field transistor is turned off and that detected when the field transistor is turned on.

However, in case that the battery has been fully charged, almost no current flows from the alternator to the battery even without the disconnection. In other words, in such case, the difference in the output voltage of the alternator between with and without the disconnection is very small. Consequently, it becomes difficult to reliably detect the disconnection.

Japanese Patent First Publication No. H07-15886 discloses a control apparatus for an automotive alternator, which includes a warning circuit for detecting and warning of disconnection between the alternator and an on-board battery to be charged by the alternator.

In this control apparatus, a voltage at a feed terminal of an alarm lamp is detected; the feed terminal is electrically connected to a plus terminal of the battery. The disconnection between the alternator and the battery is detected based on the characteristic that the voltage at the plus terminal of the battery and thus that at the feed terminal of the alarm lamp decrease with occurrence of the disconnection. More specifically, in the control apparatus, the disconnection is detected when the voltage at the feed terminal of the alarm lamp drops below a predetermined level.

However, with the above configuration, the alarm lamp must be supplied with electric power from the battery. Thus, the control apparatus cannot be applied to cases where the alarm lamp is supplied with electric power from a power source other than the battery.

SUMMARY OF THE INVENTION

According to a first aspect of the present invention, there is provided a control apparatus for an automotive alternator which is electrically connected with an on-board battery to charge the battery. The control apparatus includes a switch, a target voltage setter, a voltage regulator, and a disconnection detector.

The switch is configured to be selectively turned on and off so as to intermittently excite the alternator.

The target voltage setter works to set a target voltage.

The voltage regulator works to regulate an output voltage of the alternator to the target voltage set by the target voltage setter through controlling on/off operation the switch.

The disconnection detector works to detect disconnection between the alternator and the battery. The disconnection detector is configured to detect the disconnection, when the target voltage is changed from a lower value to a higher value, based on a time required for the voltage regulator to bring the output voltage of the alternator from the lower value to the higher value.

With the above configuration, it is possible for the control apparatus to reliably detect the disconnection between the alternator and the battery while overcoming the above-mentioned problems accompanying the prior art control apparatuses.

According to a second aspect of the present invention, there is provided a control apparatus for an automotive alternator which is electrically connected with an on-board battery to charge the battery. The control apparatus includes a switch, a target voltage setter, a voltage regulator, and a disconnection detector.

The switch is configured to be selectively turned on and off so as to intermittently excite the alternator.

The target voltage setter works to set a target voltage.

The voltage regulator works to regulate an output voltage of the alternator to the target voltage set by the target voltage setter through controlling on/off operation the switch.

The disconnection detector works to detect disconnection between the alternator and the battery. The disconnection detector is configured to detect the disconnection, when the target voltage is changed from a lower value to a higher value, based on a difference in duty cycle of the switch between after and before the change in the target voltage.

With the above configuration, it is possible for the control apparatus to reliably detect the disconnection between the alternator and the battery while overcoming the above-mentioned problems accompanying the prior art control apparatuses.

According to a third aspect of the present invention, there is provided an electric power generation system for a vehicle which includes an automotive alternator, a first control apparatus, and a second control apparatus that communicates with the first control apparatus.

The automotive alternator works to generate electric power. The alternator is electrically connected with an on-board battery to charge the battery with the electric power.

The first control apparatus includes: a switch configured to be selectively turned on and off so as to intermittently excite the alternator; a target voltage setter working to receive a command signal from the second control apparatus and set a target voltage according to the command signal; a voltage regulator working to regulate an output voltage of the alternator to the target voltage through controlling on/off operation the switch; and a duty-cycle signal transmitter working to transmit to the second control apparatus a duty-cycle signal indicative of duty cycle of the switch.

The second control apparatus includes: a target voltage determiner working to determine the target voltage; a, command signal transmitter working to transmit to the first control apparatus the command signal which indicates the target voltage determined by the target voltage determiner; a duty-cycle signal receiver working to receive the duty-cycle signal from the first control apparatus; and a disconnection detector working to detect disconnection between the alternator and the battery, the disconnection detector being configured to determine, when the target voltage is changed from a lower value to a higher value, a difference in duty cycle of the switch between after and before the change in the target voltage based on the duty-cycle signal received by the duty-cycle signal receiver and detect the disconnection based on the determined difference.

With the above configuration, it is possible for the electric power generation system to reliably detect the disconnection between the alternator and the battery while overcoming the above-mentioned problems accompanying the prior art control apparatuses.

According to a fourth embodiment of the present invention, there is provided an electric power generation system for a vehicle which includes an automotive alternator, a first control apparatus, and a second control apparatus that communicates with the first control apparatus.

The automotive alternator works to generate electric power. The alternator is electrically connected with an on-board battery via a conducting wire to charge the battery with the electric power. The conducing wire is also electrically connected to electrical load.

The first control apparatus includes: a switch being configured to be selectively turned on and off so as to intermittently excite the alternator; a voltage regulator working to regulate an output voltage of the alternator to a predetermined value through controlling on/off operation the switch; and a duty-cycle signal transmitter working to transmit to the second control apparatus a duty-cycle signal indicative of duty cycle of the switch.

The second control apparatus includes: a load change detector working to detect a change in the electrical load; a duty-cycle signal receiver working to receive the duty-cycle signal from the first control apparatus; and a disconnection detector working to detect disconnection between the alternator and the battery, the disconnection detector being configured to determine, when the change in the electrical load is detected by the load change detector, a difference in duty cycle of the switch between after and before the change in the electrical load based on the duty-cycle signal received by the duty-cycle signal receiver and detect the disconnection based on the determined difference.

With the above configuration, it is possible for the electric power generation system to reliably detect the disconnection between the alternator and the battery while overcoming the above-mentioned problems accompanying the prior art control apparatuses.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

Figure 1:
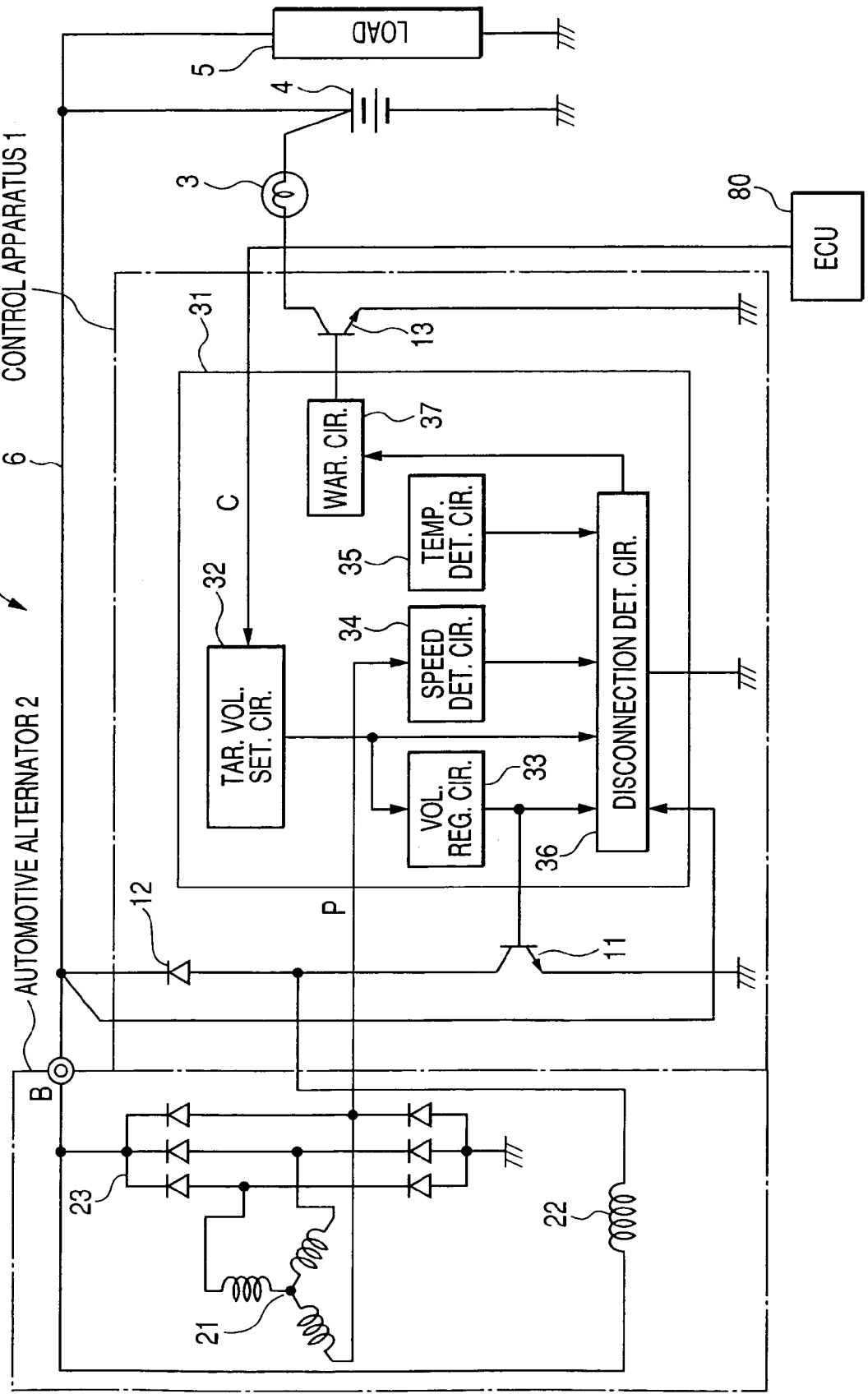
FIG. 1 is a schematic view showing the overall configuration of an electric power generation system according to the first embodiment of the invention.

The preferred embodiments of the present invention will be described hereinafter with reference to FIGS. 1-5.

It should be noted that, for the sake of clarity and understanding, identical components having identical functions in different embodiments of the invention have been marked, where possible, with the same reference numerals in each of the figures.

First Embodiment

FIG. 1 shows the overall configuration of an electric power generation system 100 according to the first embodiment of the invention. The electric power generation system 100 is for use in a motor vehicle.

As shown in FIG. 1, the electric power generation system 100 includes a control apparatus 1, an automotive alternator 2, and an ECU (Electrical Control Unit) 80.

The alternator 2 includes a three-phase stator winding 21, a field winding 22, and a rectification circuit 23. The stator winding 21 and the filed winding 22 are respectively included in a stator and a rotor of the alternator 2. The rectification circuit 23 is configured to full-wave rectify the three-phase AC output of the stator winding 21 into a DC power.

The alternator 2 also includes an output terminal B that is electrically connected to a battery 4 and electrical load 5 via a conducting wire 6, so that the battery 4 and the electrical load 5 can be supplied with the DC power necessary for charge and operation.

The control apparatus 1 is electrically connected with the alternator 2. The control apparatus 1 works to control an electric current (i.e., field current) supply to the field winding 22 of the alternator 2, thereby regulating the output voltage of the alternator 2 to a target voltage, for example, of, 14V. In addition, the control apparatus 1 is connected with the ECU 80, via prescribed signal lines, so as to communicate therewith.

The control apparatus 1 includes a field transistor (i.e., a power transistor used for field current supply) 11, a freewheeling diode 12, a warning transistor (i.e., a power transistor used for warning) 13, and a control circuit 31.

The field transistor 11 is connected in series with the field winding 22 of the alternator 2, so that the field winding 22 can be supplied with the filed current when the field transistor 11 is turned on.

On the other hand, the freewheeling diode 12 is connected in parallel with the field winding 22, so that the field current flowing in the field winding 22 can be recovered when the field transistor 11 is turned from on to off.

The warning transistor 13 is connected in series with a warning lamp 3. More specifically, the warning lamp 3 has one end connected to the plus terminal of the battery 4 and the other end grounded via the warning transistor 13, so that the warning lamp 3 can be lit when the warning transistor 13 is turned on.

The control circuit 31 works to control on/off operation of the field transistor 11, thereby regulating the output voltage of the alternator 2 to the target voltage. The control circuit 31 also works to detect disconnection between the alternator 2 and the battery 4 and activate the warning transistor 13 to light the warning lamp 3 upon detection of the disconnection. Moreover, the control circuit 31 works to receive a command signal from the ECU 80 and set the target voltage according to the command signal.

The control circuit 31 includes a target voltage setting circuit 32, a voltage regulating circuit 33, a speed detecting circuit 34, a temperature detecting circuit 35, a disconnection detecting circuit 36, and a warning circuit 37.

The target voltage setting circuit 32 works to set the target voltage. More specifically, the target voltage setting circuit 32 is configured to receive the command signal from the ECU 80, detect the target voltage that is indicated by the command signal, and provide the detected target voltage to the voltage regulating circuit 33. For example, the command signal may be in the form of a PWM (Pulse Width Modulated) signal, the duty cycle of which indicates the value of the target voltage.

The voltage regulating circuit 33 works to regulate the output voltage of the alternator 2 to the target voltage through controlling on/off operation of the field transistor 11. More specifically, the voltage regulating circuit 33 works to control duty cycle of the filed transistor 11 and output a duty-cycle signal indicative of the duty cycle of the filed transistor 11 to the disconnection detecting circuit 36.

The speed detecting circuit 34 works to detect rotational speed of the alternator 2. More specifically, the speed detecting circuit 34 is configured to input a phase voltage of the stator winding 21 via a terminal P, detect the rotational speed of the alternator 2 based on the phase voltage, and output a speed signal indicative of the detected rotational speed to the disconnection detecting circuit 36.

The temperature detecting circuit 35 works to detect temperature of the alternator 2 and output a temperature signal indicative of the detected temperature to the disconnection detecting circuit 36.

The disconnection detecting circuit 36 works to detect the disconnection between the alternator 2 and the battery 4 based on the duty-cycle signal, the speed signal, and the temperature signal that are respectively output from the voltage regulating circuit 33, the speed detecting circuit 34, and the temperature detecting circuit 35.

The warning circuit 37 works to activate the warning transistor 13 to light the warning lamp 3 in response to detection of the disconnection between the alternator 2 and the battery 4 by the disconnection detecting circuit 36.

After having described the overall configuration of the electric power generation system 100, a process of the control apparatus 1 for detecting the disconnection between the alternator 2 and the battery 4 will be described hereinafter.

Figure 2:
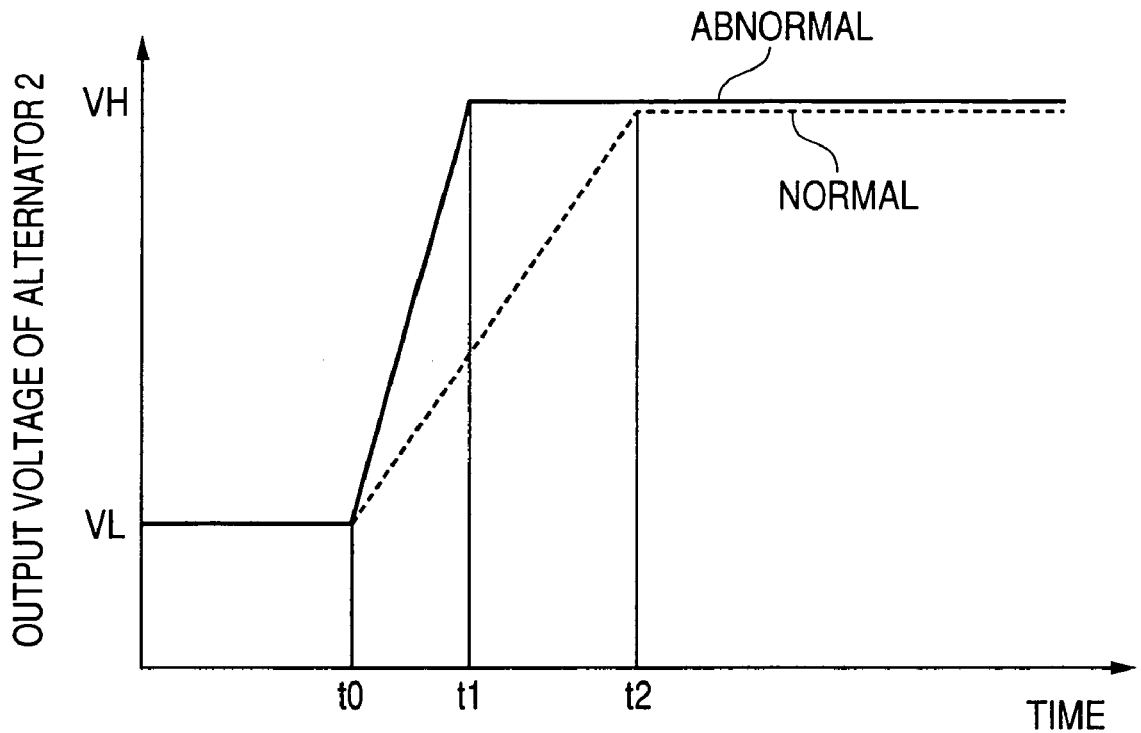
FIG. 2 is a time chart illustrating a disconnection detection process of a control apparatus according to the first embodiment of the invention.

FIG. 2 illustrates the basic principle of the disconnection detection process, where the horizontal axis represents time, while the vertical one represents the output voltage of the alternator 2.

Suppose that the target voltage of the alternator 2 is changed from a lower value VL to a higher value VH at a time instant t0.

Then, under normal conditions (i.e., conditions where no disconnection exists between the alternator 2 and the battery 4), the output voltage of the alternator 2 gradually increases from VL to VH, as indicated by a dashed line in FIG.2, due to the battery 4 and the electrical load 5 connected to the alternator 2. More specifically, the output voltage of the alternator 2 reaches VH at a time instant t2. Thus, the time required for the control apparatus 1 to bring the output voltage of the alternator 2 from VL to VH is equal to (t2−t0).

In comparison, under abnormal conditions (i.e., conditions where the battery 4 is disconnected from the alternator 2), the output voltage of the alternator 2 rapidly increases from VL to VH, as indicated by a solid line in FIG. 2, due to the no-load running of the alternator 2. More specifically, the output voltage of the alternator 2 reaches VH at a time instant t1 which is earlier than t2. Thus, the time required for the control apparatus 1 to bring the output voltage of the alternator 2 from VL to VH is equal to (t1−t0), which is shorter than (t2−t0).

Accordingly, it is possible for the control apparatus 1 to reliably detect the disconnection between the alternator 2 and the battery 4 based on the time required to bring the output voltage of the alternator 2 from VL to VH.

Specifically, in the present embodiment, the disconnection detecting circuit 36 of the control apparatus 1 is configured to determine the time required for the voltage regulating circuit 33 to bring the output voltage of the alternator 2 from VL to VH, compare the determined time with a predetermined threshold T, and determine that the battery 4 is disconnected from the alternator 2 when the time is shorter than T.

In addition, the threshold T is so predetermined as to be shorter than the time required for the voltage regulating circuit 33 to bring the output voltage of the alternator 2 from VL to VH with the minimum load of the alternator 2. The minimum load of the alternator 2 is composed of the battery 4 and the electrical load 5 that includes only electrical devices and circuits required to be constantly connected to the alternator 2.

Second Embodiment

Figure 3:
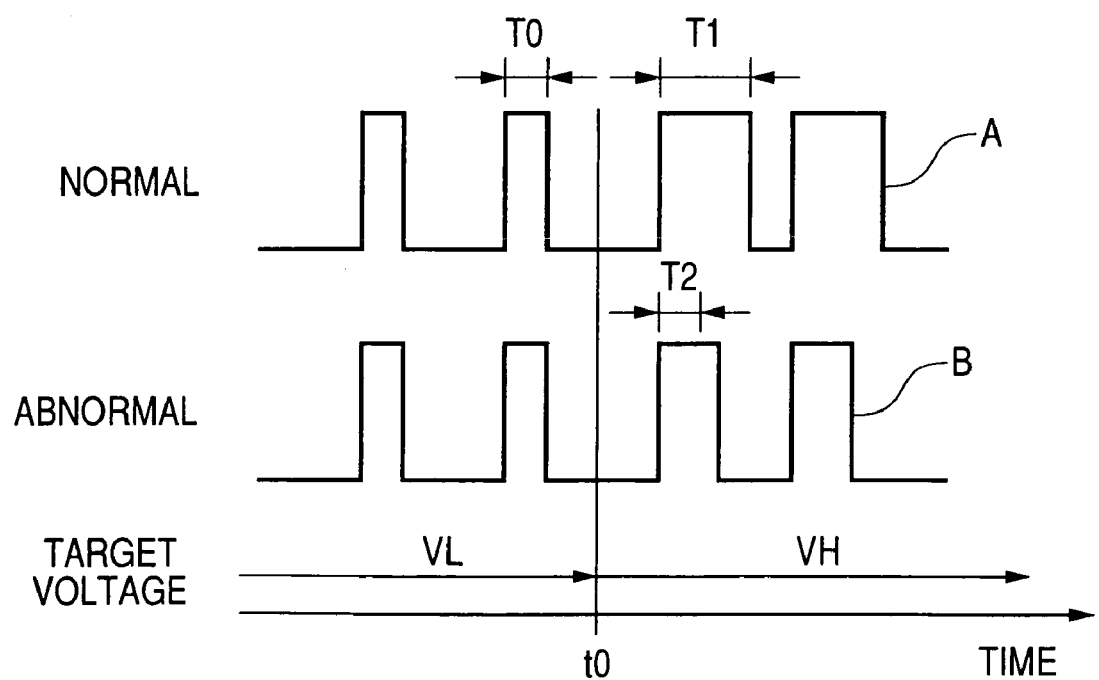
FIG. 3 is a time chart illustrating a disconnection detection process of the control apparatus according to the second embodiment of the invention.

FIG. 3 illustrates the basic principle of a disconnection detection process of the control apparatus 1 according to the present embodiment, which is different from the disconnection detection process according to the previous embodiment.

Suppose that the target voltage of the alternator 2 is changed from the lower value VL to the higher value VH at a time instant t0.

Then, under normal conditions, the on-time of the field transistor 11 considerably increases from T0 to T1, as indicated by a pulse A in FIG. 3, due to the battery 4 and the electrical load 5 connected to the alternator 2. In other words, the difference in duty cycle of the field transistor 11 between after and before the change in the target voltage is large.

In comparison, under abnormal conditions, the on-time of the field transistor 11 slightly increases from T0 to T2, as indicated by a pulse B in FIG. 3, due to the no-load running of the alternator 2. In other words, the difference in duty cycle of the field transistor 11 between after and before the change in the target voltage is small.

Accordingly, it is possible for the control apparatus 1 to reliably detect the disconnection between the alternator 2 and the battery 4 based on the difference in duty cycle of the field transistor 11 between after and before the change in the target voltage.

Specifically, in the present embodiment, the disconnection detecting circuit 36 of the control apparatus 1 is configured to determine the difference based on the duty-cycle signal from the voltage regulating circuit 33, compare the determined difference with a predetermined threshold D, and determine that the battery 4 is disconnected from the alternator 2 when the difference is less than D.

In addition, similar to the threshold T in the previous embodiment, the threshold D is so predetermined as to be less than the difference determined with the alternator 2 operating under the minimum load condition.

Third Embodiment

This embodiment illustrates an electric power generation system 100A which has a configuration similar to that of the electric power generation system 100 according to the first embodiment. Accordingly, only the differences therebetween will be described hereinafter.

Figure 4:
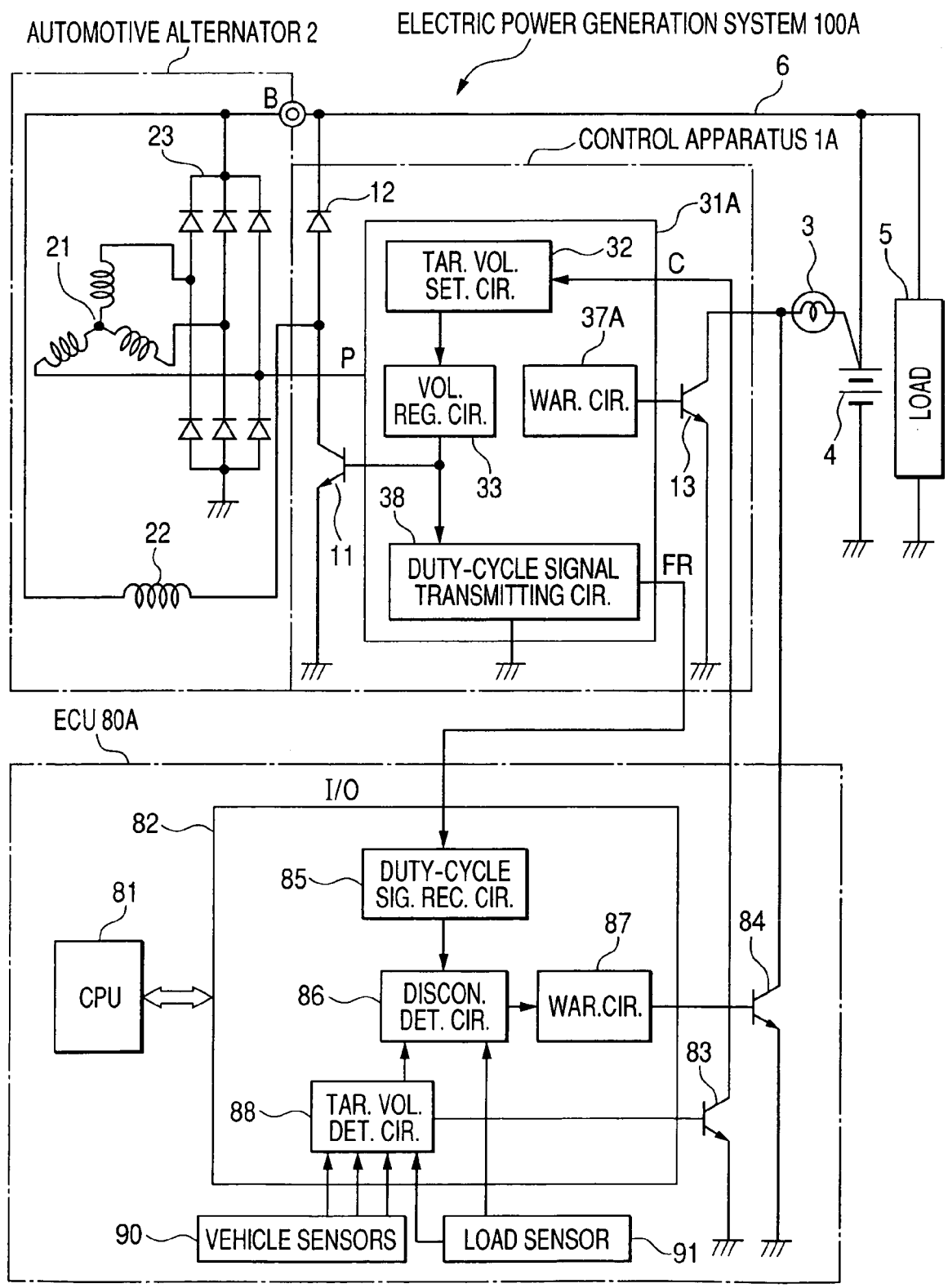
FIG. 4 is a schematic view showing the overall configuration of an electric power generation system according to the third embodiment of the invention.

Referring to FIG. 4, the electric power generation system 100A according to the present embodiment includes a control apparatus 1A, an automotive alternator 2, and an ECU 80A.

The control apparatus 1A includes a field transistor 11, a freewheeling diode 12, and a control circuit 31A.

The control circuit 31A includes a target voltage setting circuit 32, a voltage regulating circuit 33, a warning circuit 37A, and a duty-cycle signal transmitting circuit 38.

The warning circuit 37A works to activate the warning transistor 13 to light the warning lamp 3 when the electric power generation system 100A is in a fault condition other than the disconnection between the alternator 2 and the battery 4 (e.g. stop of power generation).

The duty-cycle signal transmitting circuit 38 works to receive from the voltage regulating circuit 33 the duty-cycle signal, which indicates the duty cycle of the field transistor 11, and transmit it to the ECU 80A via a FR terminal.

The ECU 80A includes a CPU (Central Processing Unit) 81, an I/O (Input/Output) control unit 82, transistors 83 and 84, vehicle condition sensors 90, and an electrical load sensor 91.

The CPU 81 is configured to perform various controls in the ECU 80A in accordance with a program installed in a memory (not shown) of the ECU 80A.

The I/O control unit 82 works to activate the transistor 83 to transmit the command signal indicative of the target voltage to the control apparatus 1A. The I/O control unit 82 also works to receive the duty-cycle signal from the control apparatus 1A and detect the disconnection between the alternator 2 and the battery 4 based on the duty-cycle signal. Further, upon detection of the disconnection, the I/O control unit 82 activates the transistor 84 to light the warning lamp 3.

The I/O control unit 82 includes a duty-cycle signal receiving circuit 85, a disconnection detecting circuit 86, a warning circuit 87, and a target voltage determining circuit 88.

The duty-cycle signal receiving circuit 85 works to receive the duty-cycle signal transmitted from the control apparatus 1A and provide the received signal to the disconnection detecting circuit 86.

The disconnection detecting circuit 86 works to detect the disconnection between the alternator 2 and the battery 4 based on the duty-cycle signal provided from the duty-cycle signal receiving circuit 85.

The warning circuit 87 works to activate the transistor 84 to light the warning lamp 3 in response to detection of the disconnection by the disconnection detecting circuit 36.

The target voltage determining circuit 88 works to determine the value of the target voltage based on sensing signals output from the vehicle condition sensors 90 and the electrical load sensor 91. The target voltage determining circuit 88 also works to activate the transistor 83 to transmit the command signal indicative of the determined target voltage to the control apparatus 1A.

The vehicle condition sensors 90 include, for example, a vehicle speed sensor working to sense running speed of the vehicle and a temperature sensor working to sense ambient temperature.

The electrical load sensor 91 works to sense whether the electrical load 5 is switched on or off.

In the above-described electric power generation system 100A, the disconnection between the alternator 2 and the battery 4 is detected by the ECU 80A, not by the control apparatus 1A.

However, the disconnection detection process of the ECU 80A is based on the same principle as that of the control apparatus 1 according to the second embodiment.

Specifically, referring again to FIG. 3, suppose that the target voltage of the alternator 2 is changed from the lower value VL to the higher value VH at a time instant t0.

Then, under normal conditions, the on-time of the field transistor 11 considerably increases from T0 to T1, as indicated by the pulse A in FIG. 3, due to the battery 4 and the electrical load 5 connected to the alternator 2. In other words, the difference in duty cycle of the field transistor 11 between after and before the change in the target voltage is large.

In comparison, under abnormal conditions, the on-time of the field transistor 11 slightly increases from T0 to T2, as indicated by the pulse B in FIG. 3, due to the no-load running of the alternator 2. In other words, the difference in duty cycle of the field transistor 11 between after and before the change in the target voltage is small.

Accordingly, it is possible for the ECU 80A to reliably detect the disconnection between the alternator 2 and the battery 4 based on the difference in duty cycle of the field transistor 11 between after and before the change in the target voltage.

Specifically, in the present embodiment, the disconnection detecting circuit 86 of the ECU 80A is configured to determine the difference based on the duty-cycle signal transmitted from the control apparatus 1A, compare the determined difference with the predetermined threshold D, and determine that the battery 4 is disconnected from the alternator 2 when the difference is less than D.

Fourth Embodiment

Figure 5:
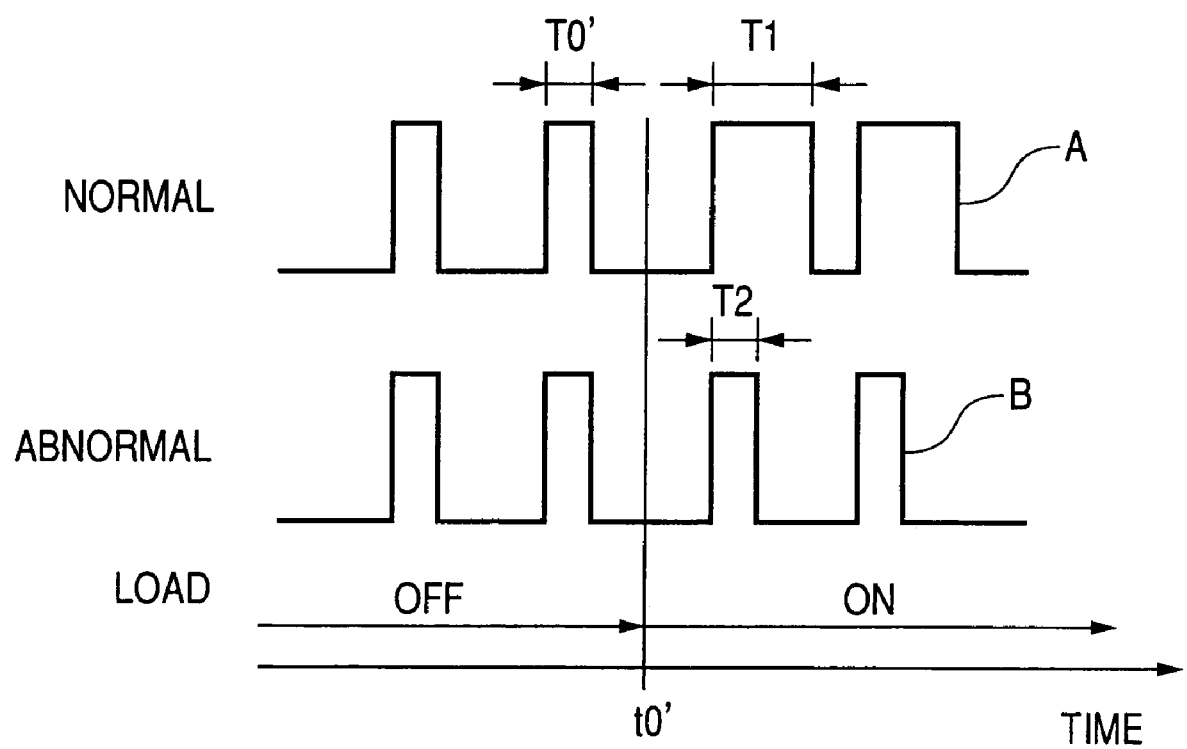
FIG. 5 is a time chart illustrating a disconnection detection process of the electric power generation system according to the fourth embodiment of the invention.

FIG. 5 illustrates the basic principle of a disconnection detection process of the ECU 80A according to the present embodiment, which is different from the disconnection detection process according to the previous embodiment.

In the present embodiment, the disconnection is detected upon a change in the electrical load 5 from off to on, not upon the change in the target voltage from VL to VH.

Specifically, referring to FIG. 5, suppose that the electrical load 5 is switched from off to on at a time instant t0'.

Then, under normal conditions, the on-time of the field transistor 11 increases from T0' to T1, as indicated by a pulse A in FIG. 5, due to the electrical load 5 newly connected to the alternator 2. In other words, there is an observable difference in duty cycle of the field transistor 11 between after and before the change in the electrical load 5.

In comparison, under abnormal conditions, the on-time of the field transistor 11 hardly changes, as indicted by a pulse B in FIG. 5 (where, T0'≈T2). This is because the change in the electrical load 5 from off to on cannot cause any change in operating condition of the alternator 2. Thus, the difference in duty cycle of the field transistor 11 between after and before the change in the electrical load 5 is almost equal to zero.

Accordingly, it is possible for the ECU 80A to reliably detect the disconnection between the alternator 2 and the battery 4 based on the difference in duty cycle of the field transistor 11 between after and before the change in the electrical load 5.

Specifically, in the present embodiment, the disconnection detecting circuit 86 of the ECU 80A is configured to determine the difference based on the duty-cycle signal transmitted from the control apparatus 1A, compare the determined difference with a predetermined threshold D1, and determine that the battery 4 is disconnected from the alternator 2 when the difference is less than D1.

Other Embodiment

While the above particular embodiments of the invention have been shown and described, it will be understood by those who practice the invention and those skilled in the art that various modifications, changes, and improvements may be made to the invention without departing from the spirit of the disclosed concept.

For example, in the control apparatus 1 according to the first embodiment, the disconnection detecting circuit 36 may be modified to detect the disconnection between the alternator 2 and the battery 4 through performing a disconnection detection process that is a combination of the disconnection detection processes according to the first and second embodiments.

In general, the characteristic of output voltage change of the alternator 2 depends on operating condition of the alternator 2, which is represented by, for example, the rotational speed of the alternator 2, the temperature of the alternator 2, and the duty cycle of the field transistor 11 before the change in the target voltage.

Accordingly, to improve the accuracy of the disconnection detection, the disconnection detecting circuit 36 of the control apparatus 1 may be modified to first correct the predetermined threshold T or D according to at least one of the rotational speed of the alternator 2, the temperature of the alternator 2, and the duty cycle of the field transistor 11 before the change in the target voltage and then perform the disconnection detection using a corrected threshold T' or D'. In addition, the disconnection detecting circuit 36 may determine those parameters based on the speed signal, the temperature signal, and the duty-cycle signal which are respectively output from the speed detecting circuit 34, the temperature detecting circuit 35, and the voltage regulating circuit 33.

In the electric power generation system 100 according to the first embodiment, the control apparatus 1 is configured to detect the disconnection between the alternator 2 and the battery 4 and light the warning lamp 3 upon detection of the disconnection.

However, the electric power generation system 100 may be modified such that: the control apparatus 1 detects the disconnection and informs the ECU 80 of the detection results; the ECU 80 lights the warning lamp 3 depending on the detection results.

Such modifications, changes, and improvements within the skill of the art are intended to be covered by the appended claims.

What is claimed is:

1. A control apparatus for an automotive alternator which is electrically connected with an on-board battery to charge the battery, the control apparatus comprising:
    a switch configured to be selectively turned on and off so as to intermittently excite the alternator;
    a target voltage setter working to set a target voltage;
    a voltage regulator working to regulate an output voltage of the alternator to the target voltage set by the target voltage setter through controlling on/off operation the switch; and
    a disconnection detector working to detect disconnection between the alternator and the battery, the disconnection detector being configured to detect the disconnection, when the target voltage is changed from a lower value to a higher value, based on a time required for the voltage regulator to bring the output voltage of the alternator from the lower value to the higher value.

2. The control apparatus as set forth in claim 1, wherein the disconnection detector is configured to compare the time with a predetermined threshold and determine that the battery is disconnected from the alternator when the time is shorter than the predetermined threshold.

3. The control apparatus as set forth in claim 2, further comprising a speed detector that works to detect rotational speed of the alternator, wherein the disconnection detector is configured to correct the predetermined threshold according to the rotational speed detected by the speed detector, compare the time with the corrected threshold, and determine that the battery is disconnected from the alternator when the time is shorter than the corrected threshold.

4. The control apparatus as set forth in claim 2, further comprising a temperature detector that works to detect temperature of the alternator, wherein the disconnection detector is configured to correct the predetermined threshold according to the temperature detected by the temperature detector, compare the time with the corrected threshold, and determine that the battery is disconnected from the alternator when the time is shorter than the corrected threshold.

5. The control apparatus as set forth in claim 2, wherein the disconnection detector is configured to correct the predetermined threshold according to a duty cycle of the switch before the change in the target voltage, compare the time with the corrected threshold, and determine that the battery is disconnected from the alternator when the time is shorter than the corrected threshold.

6. The control apparatus as set forth in claim 1, further comprising a warning device that works to warn of the disconnection between the alternator and the battery in response to detection of the disconnection by the disconnection detector.

7. A control apparatus for an automotive alternator which is electrically connected with an on-board battery to charge the battery, the control apparatus comprising:
a switch configured to be selectively turned on and off so as to intermittently excite the alternator;
a target voltage setter working to set a target voltage;
a voltage regulator working to regulate an output voltage of the alternator to the target voltage set by the target voltage setter through controlling on/off operation the switch; and
a disconnection detector working to detect disconnection between the alternator and the battery, the disconnection detector being configured to detect the disconnection, when the target voltage is changed from a lower value to a higher value, based on a difference in duty cycle of the switch between after and before the change in the target voltage.

8. The control apparatus as set forth in claim 7, wherein the disconnection detector is configured to compare the difference with a predetermined threshold and determine that the battery is disconnected from the alternator when the difference is less than the predetermined threshold.

9. The control apparatus as set forth in claim 8, further comprising a speed detector that works to detect rotational speed of the alternator, wherein the disconnection detector is configured to correct the predetermined threshold according to the rotational speed detected by the speed detector, compare the difference with the corrected threshold, and determine that the battery is disconnected from the alternator when the difference is less than the corrected threshold.

10. The control apparatus as set forth in claim 8, further comprising a temperature detector that works to detect temperature of the alternator, wherein the disconnection detector is configured to correct the predetermined threshold according to the temperature detected by the temperature detector, compare the difference with the corrected threshold, and determine that the battery is disconnected from the alternator when the difference is less than the corrected threshold.

11. The control apparatus as set forth in claim 8, wherein the disconnection detector is configured to correct the predetermined threshold according to the duty cycle of the switch before the change in the target voltage, compare the difference with the corrected threshold, and determine that the battery is disconnected from the alternator when the difference is less than the corrected threshold.

12. The control apparatus as set forth in claim 7, further comprising a warning device that works to warn of the disconnection between the alternator and the battery in response to detection of the disconnection by the disconnection detector.

13. An electric power generation system for a vehicle comprising:
an automotive alternator working to generate electric power, the alternator being electrically connected with an on-board battery to charge the battery with the electric power;
a first control apparatus; and
a second control apparatus that communicates with the first control apparatus,
wherein the first control apparatus includes:
a switch configured to be selectively turned on and off so as to intermittently excite the alternator;
a target voltage setter working to receive a command signal from the second control apparatus and set a target voltage according to the command signal;
a voltage regulator working to regulate an output voltage of the alternator to the target voltage through controlling on/off operation the switch; and
a duty-cycle signal transmitter working to transmit to the second control apparatus a duty-cycle signal indicative of duty cycle of the switch, and
wherein the second control apparatus includes:
a target voltage determiner working to determine the target voltage;
a command signal transmitter working to transmit to the first control apparatus the command signal which indicates the target voltage determined by the target voltage determiner;
a duty-cycle signal receiver working to receive the duty-cycle signal from the first control apparatus; and
a disconnection detector working to detect disconnection between the alternator and the battery, the disconnection detector being configured to determine, when the target voltage is changed from a lower value to a higher value, a difference in duty cycle of the switch between after and before the change in the target voltage based on the duty-cycle signal received by the duty-cycle signal receiver and detect the disconnection based on the determined difference.

14. The electric power generation system as set forth in claim 13, wherein the disconnection detector of the second control apparatus is configured to compare the difference with a predetermined threshold and determine that the battery is disconnected from the alternator when the difference is less than the predetermined threshold.

15. The electric power generation system as set forth in claim 13, wherein the second control apparatus further includes a warning device that works to warn of the disconnection between the alternator and the battery in response to detection of the disconnection by the disconnection detector.

16. An electric power generation system for a vehicle comprising:
an automotive alternator working to generate electric power, the alternator being electrically connected with an on-board battery via a conducting wire to charge the battery with the electric power, the conducing wire being also electrically connected to electrical load;
a first control apparatus; and
a second control apparatus that communicates with the first control apparatus,
wherein the first control apparatus includes:
a switch being configured to be selectively turned on and off so as to intermittently excite the alternator;
a voltage regulator working to regulate an output voltage of the alternator to a predetermined value through controlling on/off operation the switch; and
a duty-cycle signal transmitter working to transmit to the second control apparatus a duty-cycle signal indicative of duty cycle of the switch, and
wherein the second control apparatus includes:
a load change detector working to detect a change in the electrical load;
a duty-cycle signal receiver working to receive the duty-cycle signal from the first control apparatus; and
a disconnection detector working to detect disconnection between the alternator and the battery, the disconnection detector being configured to determine, when the change in the electrical load is detected by the load change detector, a difference in duty cycle of the switch between after and before the change in the electrical load based on the duty-cycle signal received by the duty-cycle signal receiver and detect the disconnection based on the determined difference.

17. The electric power generation system as set forth in claim 16, wherein the disconnection detector of the second control apparatus is configured to compare the difference with a predetermined threshold and determine that the battery is disconnected from the alternator when the difference is less than the predetermined threshold.

18. The electric power generation system as set forth in claim 16, wherein the second control apparatus further includes a warning device that works to warn of the disconnection between the alternator and the battery in response to detection of the disconnection by the disconnection detector.

* * * * *